United States Patent [19]

Fujisawa et al.

[11] Patent Number: 4,563,356

[45] Date of Patent: Jan. 7, 1986

[54] LACTIC ACID FERMENTATION PRODUCTS OF SUNFLOWER SEED MILK

[75] Inventors: Koichi Fujisawa; Akiko Yokoyama; Gohfu Suzukamo, all of Osaka, Japan

[73] Assignee: Sumitomo Chemical Company Limited, Osaka, Japan

[21] Appl. No.: 558,664

[22] Filed: Dec. 6, 1983

[30] Foreign Application Priority Data

Dec. 6, 1982 [JP] Japan ................................ 57-213778
Dec. 6, 1982 [JP] Japan ................................ 57-213779

[51] Int. Cl.$^4$ .............................................. A23L 1/36
[52] U.S. Cl. ...................................... 426/44; 435/853; 435/854; 435/885
[58] Field of Search .................... 426/44, 46; 435/139, 435/853, 854, 885

[56] References Cited

U.S. PATENT DOCUMENTS 3,857,970 12/1974 Tsumura et al. ...................... 426/46
3,937,843 2/1976 Osaka et al. ........................... 426/46

FOREIGN PATENT DOCUMENTS 2120520 12/1983 United Kingdom .

OTHER PUBLICATIONS

Journal of Food Technology 15, 647–652, 653–659 (1980).
Journal of Food Protection 42, 895–899 (1979).
J. Milk Food Technology. 37 71,73 (1974).
Process Biochemistry, 11, 23–25 (1976).

*Primary Examiner*—Sam Rosen
*Attorney, Agent, or Firm*—Armstrong, Nikaido Marmelstein & Kubovcik

[57] ABSTRACT

A lactic acid fermented sunflower seed milk and imitation acidic dairy desserts and drinks made from vegetable seed milk and the product thereof. Lactic acid fermented sunflower seed milk and imitation acidic dairy desserts and drinks made from vegetable seed milk are obtained by inoculating sunflower seed milk with lactic acid bacteria to carry out fermentation, and subsequently adding acid drinks and/or organic acids to obtain the desired flavor.

6 Claims, No Drawings

LACTIC ACID FERMENTATION PRODUCTS OF SUNFLOWER SEED MILK

The present invention relates to lactic acid fermented sunflower seed milk or imitation acidic dairy desserts and drinks made from vegetable seed milk and production thereof. More particularly, the present invention relates to lactic acid fermented sunflower seed milk or imitation acidic dairy desserts and drinks made from vegetable seed milk obtained by inoculating sunflower seed milk with lactic acid bacteria to carry out fermentation and as need arises, additionally adding acidic drinks and/or organic acids, and to production thereof.

A sunflower seed is an oil seed of the second largest output in the world, and its output in the world in the 1978/79 agricultural year is said to be about 13,000,000 tons [Yushi (Oil and Fat), Vol. 33, 54]. At present, however, of the constituents of sunflower seed, the oil alone is used as food, and other constituents, proteins and glucides, are only used as feed. Given the world-wide shortage of protein, it is regarded as necessary to make effective use of unused protein resources and proteins of low utility.

Also, in recent years, importance of taking vegetable proteins and fats is pointed out, and for the reason of health, for example prevention of the diseases of adult people, said importance is being recognized by consumers. As a result, emulsified drinks with soybean as material are recently developed and used as drinks, but they are not always satisfactory in terms of tastiness as well as an effect on health.

In view of the present situation described above, the present inventors, as a result of an extensive study, found that, when a sunflower seed has been processed into vegetable seed milk, the vegetable seed milk is superior as milk drinks for the following reasons: there is no grassy-smell unlike soy milk, the content of linolic acid as well as that of α-tocopherol of high physiological activity are high, and further the ratio of α-tocopherol content to linolic acid content is so high that there is also obtained an effect to prevent peroxylipids. The present inventors thus attained to the invention on a method for producing sunflower seed milk (Japanese Patent Application No. 66490/1982).

In general, addition of acidic drinks or organic acids to sunflower seed milk causes a reduction in the pH of the vegetable seed milk with the result that coagulation of proteins contained in the vegetable seed milk is brought about, and in the vicinity of the isoelectric point of protein, deposition of the protein becomes so remarkable that the value as a food and drink is lost.

Under this situation, the present inventors found that lactic acid fermented sunflower seed milk obtained by lactic acid fermentation of sunflower seed milk is useful as a food and drink superior in tastiness and stability, and that this lactic acid fermented sunflower seed milk yields imitation acidic dairy desserts and drinks without causing deposits even when mixed with acidic drinks and/or organic acids. This product obtained is useful as a food and drink which is superior as a lactic acid fermented sunflower seed milk. The present inventors thus completed the present invention.

The lactic acid fermented sunflower seed milk and the imitation acidic dairy desserts and drinks made from vegetable seed milk according to the present invention can be produced as follows.

By inoculating sunflower seed milk with lactic acid bacteria to carry out lactic acid fermentation, the lactic acid fermented sunflower seed milk is obtained, and if necessary, a stabilizer or gelling agent may be added thereto. In producing the imitated acidic dairy desserts and drinks made from vegetable seed milk, said lactic acid fermented sunflower seed milk is further mixed with the acidic drink and/or the organic acid and if necessary, a stabilizer or gelling agent may be added. Further, fruit flesh and pulp, etc. may be added according to taste.

When the lactic acid fermented sunflower seed milk is used as a drink, it is preferably brought into a state wherein it has a suitable viscosity or fluidity for drinking, by timely addition of water.

When, after adding acidic drink and/or organic acid to curd after lactic acid fermentation and further adding a gelling agent or stabilizer if necessary, the resulting mixture is homogenized on a high-pressure homogenizer or the like, drinks having a more smooth taste are obtained.

In this way, novel lactic acid fermented milk, imitation acid dairy desserts and drinks, with sunflower seed milk as a material having a peculiar flavor and superior tastiness and stability can be produced. The sunflower seed imitation milk products of this invention may be pasteurized without ill effect.

As sunflower seed milk used as a material in producing the composition of the present invention, vegetable seed milk obtained from sunflower seed, or sunflower seed and oil seeds other than sunflower, and said vegetable seed milk containing added milk proteins can be used. As a method to produce vegetable seed milk by applying pulverization treatment such as grinding to sunflower seed which is a material, for example a method disclosed in Japanese Patent Application No. 66490/1982 of the present inventors may be used. But, for example a method of obtaining sunflower seed milk by pulverizing sunflower seed in the presence of water and heat-treating the resulting slurry at a temperature between not lower than 65° C. and not higher than the boiling point with stirring while adjusting the pH of the slurry to from not less than 6.5 to not more than 7.5, followed by applying again pulverization treatment, is more preferred.

As the oil seed other than sunflower, for example one or more of soybean, peanut, pine nut, sesame, cacao bean and the like may be used according to taste without special limitation. In this case, to use at least not less than 20%, as expressed in weight ratio, of sunflower seed is also preferred to make use of the flavor of sunflower seed.

As the vegetable seed milk obtained from sunflower seed and oil seeds other than sunflower, there may be used vegetable seed milk obtained by applying pulverization treatment such as grinding to a mixture of sunflower seed and oil seeds other than sunflower in the presence of water, or vegetable seed milk obtained by separately grinding each of sunflower seed and oil seeds other than sunflower in the presence of water and mixing the resulting vegetable seed milks.

When milk protein is added to the vegetable seed milk, its amount added is not more than 15% based on vegetable seed milk obtained from sunflower seed or sunflower seed and oil seeds other than sunflower.

Addition of milk protein to the vegetable seed milk not only prevents the sedimentation of its constituents to make the curd obtained therefrom by fermentation uniform and fine in texture, but also increases the protein content of the product.

The term "milk protein" referred to herein means a substance containing proteins constituting milk, and it includes milk, dairy products and substances or compositions containing proteins extracted therefrom. As milk, for example cow's milk, goat's milk and the like may be used according to taste, but cow's milk is preferred in that it is available abundantly and stably. As dairy products, for example skim milk, concentrated milk, whole milk powder, skim milk powder, whey and the like may be used. Further, substances or compositions containing proteins extracted from milk or dairy products include for example casein, its potassium, sodium or calcium salt, compositions comprising casein and its potassium, sodium or calcium salt, lactalbumin and the like.

The lactic acid bacteria used are not particularly limited, and any of the conventionally used ones may be used. Preferably, however, one or more of *Lactobacillus acidophilus, Lactobacillus bulgaricus, Streptococcus thermophilus* and *Streptococcus lactis* are used.

The method itself of lactic acid fermentation is well known, and the usual methods may be applied. But, a preferred fermentation condition is a period of 3 to 20 hours at 35° to 50° C., more preferably a period of 4 to 16 hours at 35° to 50° C. Ripening may be applied at not higher than 10° C. after completion of fermentation.

In the fermentation, various sugars, honey, skim milk powder, etc. may be added to promote fermentation, but it is not always necessary to add them.

As the acidic drinks, various fruit juices, coffee, etc. may be used according to taste. As examples of fruit juice, orange, lemon, grapefruit, pineapple, strawberry and the like may be used alone or in mixtures of two or more of them. The form of fruit juice and coffee also are not particularly limited, and fresh fruit juices, powdered ones, etc. may be used optionally.

The amount of acidic drink added is not particularly limited, and when there is a wish to emphasize the flavor of lactic acid fermented sunflower seed milk, the amount of fruit juice added may be made, for example about 5 to about 20%. While, when there is a wish to emphasize the flavor of fruit juice, for example 60 to 80% of the fruit juice may be added.

Also, in adding an organic acid, its kind and amount are not particularly limited, and for example citric acid, malic acid, lactic acid, etc. may be added according to taste.

As the gelling agent or stabilizer, for example one or more of pectin, agar, carrageenan and gelatin may be used. The amount thereof added varies depending upon which of drinks or yogurt-like foods is desired. In the case of pectin, for example, its amount for drinking purpose is 0.1 to 1%, amounts beyond 1% yielding yogurt-like foods.

By adding a gelling agent or stabilizer, drinks of good stability are obtained for the purpose of drinking, and imitation yogurt having a high gel strength and good retention is obtained for the purpose of obtaining yogurt-like semi-solid foods.

By the method described above, lactic acid fermented sunflower seed milk or the other imitation acidic dairy desserts and drinks made from sunflower seed milk are obtained which are a novel lactic acid fermented product having a peculiar flavor and superior in tastiness and stability or shape retention. But, perfuming agents, coloring agents, sweetening agents and other commonly used additives may be added according to taste.

The present invention will be illustrated in more detail with reference to the following examples. Reference example Sixty grams of a hull-free (dehulled) sunflower seed was soaked for 5 minutes in 300 g of boiling water, followed by draining. The soaked seed was twice treated on a wet-type pulverizer while adding 540 g of water containing 0.2% of sodium ascorbate and 0.4% of nutrose (Sodium caseinate). The pH of the resulting slurry was adjusted to 7.0 with 1N-NaHCO$_3$ while maintaining the slurry at 80° C. for 10 minutes with stirring. Thereafter, the slurry was further pulverized on a wet-type pulverizer and a high-pressure homogenizer, centrifuged to remove insoluble solid matters, and after pasteurized by heating, homogenized to obtain a sunflower seed milk.

EXAMPLE 1

Five grams of honey was added to 500 g of heat-pasteurized sunflower seed milk which was then inoculated with a mixture of *Lactobacillus bulgaricus* and *Streptococcus thermophilus*. Fermentation was then carried out at 45° C. for 6 hours to obtain lactic acid fermentation curd. The lactic acid fermented sunflower seed milk thus obtained had a peculiar flavor and excellent tastiness.

EXAMPLE 2

350 Grams of lactic acid fermented sunflower seed milk obtained in the same manner as in Example 1 was added with stirring to 1070 g of water (10° C.) in which 10 g of pectin, 100 g of granulated sugar and 25 g of honey were previously dissolved. Thereafter, the mixture was homogenized by means of a high-pressure homogenizer and pasteurized.

The drink obtained was superior in tastiness and stability.

EXAMPLE 3

Five grams of honey and 1 g of skim milk powder were added to 500 g of sunflower seed milk which was then fermented at 45° C. for 6 hours using a mixture of *Lactobacillus bulgaricus* and *Streptococcus thermophilus* to obtain lactic acid fermentation curd. Said curd was stored for 15 hours in a refrigerator of 5° C. While, 10 g of pectin, 100 g of granulated sugar, 25 g of honey and 5 g of citric acid were dispersed in 570 g of distilld water and thoroughly dissolved by heating to 80° C., followed by cooling to 10° C. Thereafter, 350 g of the fermentation curd of sunflower seed milk was added to said cooled pectin-containing solution with stirring, and 500 g of orange juice was further added thereto, followed by thorough stirring. The sour drink obtained was then pasteurized and homogenized on a high-pressure homogenizer to obtain the objective product.

The product thus obtained had a peculiar flavor, excellent tastiness and stability.

EXAMPLE 4

Experiment was carried out in the same manner as in Example 3 except that vegetable seed milk obtained from a 1:1 (by weight) mixture of sunflower seed and soybean was used in place of sunflower seed milk.

The product thus obtained had a peculiar flavor, excellent tastiness and stability.

What is claimed is:

1. A lactic acid fermented sunflower seed milk which is prepared by a process comprising pulverizing sunflower seed in the presence of water to produce a slurry; heat-treating the slurry at a temperature between 65° C. and the boiling point of the slurry; adjusting the pH of the slurry to 6.5 to 7.5; removing solid matter from the slurry and then fermenting the resultant liquid at a temperature between 35° C. and 50° C. for between 3 hours and 20 hours using lactic acid producing bacteria to produce said fermented sunflower seed milk.

2. The lactic acid fermented sunflower seed milk according to claim 1 further comprising the addition of at least one member selected from the group consisting of an acidic drink, an organic acid, a stabilizer and a gelling agent.

3. A lactic acid fermented sunflower seed milk according to claim 2, wherein each of the stabilizer and gelling agent is selected from the group consisting of pectin, agar, carrageenan and gelatin.

4. A lactic acid fermented sunflower seed milk according to claims 2 or 3 which also contains a fermented vegetable seed milk obtained from an oil seed other than sunflower seeds.

5. A lactic acid fermented sunflower seed milk as described in claim 2, wherein the sunflower seed milk is a one containing not more than 15% of milk protein.

6. A method as described in claim 1, wherein the lactic acid producing bacteria are one or more members selected from the group consisting of *Lactobacillus acidophilus, Lactobacillus bulgaricus, Streptococcus thermophilus* and *Streptococcus lactis.*

* * * * *